(12) United States Patent
Goldberg et al.

(10) Patent No.: US 8,860,993 B2
(45) Date of Patent: Oct. 14, 2014

(54) SYSTEM AND METHOD FOR GENERATING AUTOMATED AUTOGRAPHS

(76) Inventors: Seth G. Goldberg, Plainview, NY (US); Charles D. Albanese, Mahwah, NJ (US)

(*) Notice: Subject to any disclaimer, the term of this patent is extended or adjusted under 35 U.S.C. 154(b) by 249 days.

(21) Appl. No.: 13/566,004

(22) Filed: Aug. 3, 2012

(65) Prior Publication Data

US 2014/0036302 A1    Feb. 6, 2014

(51) Int. Cl.
*G06F 3/12*    (2006.01)
*H04N 1/00*    (2006.01)

(52) U.S. Cl.
USPC .......... 358/1.15; 358/1.6; 358/1.18; 358/1.11

(58) Field of Classification Search
CPC ....................................................... G06F 17/20
See application file for complete search history.

(56) References Cited

U.S. PATENT DOCUMENTS

| | | | |
|---|---|---|---|
| 6,691,916 | B2 | 2/2004 | Noyes |
| 6,907,131 | B2 | 6/2005 | Verhoeven et al. |
| 7,092,116 | B2 | 8/2006 | Calaway |
| 7,697,713 | B1 | 4/2010 | Verhoeven et al. |
| 2001/0033676 | A1 | 10/2001 | Noyes |
| 2002/0012134 | A1 | 1/2002 | Calaway |
| 2004/0234097 | A1 | 11/2004 | Verhoeven et al. |
| 2007/0053004 | A1 | 3/2007 | Calaway |
| 2011/0294473 | A1 | 12/2011 | Subburam |

FOREIGN PATENT DOCUMENTS

| | | |
|---|---|---|
| AU | 2003215362 A1 | 3/2004 |
| WO | WO0157761 A1 | 8/2001 |
| WO | WO03009520 A1 | 1/2003 |
| WO | WO2004021263 A1 | 3/2004 |
| WO | WO2009144740 A2 | 12/2009 |
| WO | PCT/US2013/053341 | 11/2013 |

*Primary Examiner* — Dov Popovici
(74) *Attorney, Agent, or Firm* — James R. Klaiber; Pryor Cashman LLP

(57) ABSTRACT

A system and method for generating automated autographs on a computer with a memory and a processor, including a scanner for inputting handwritten writing samples and a content management system stored on a computer readable medium adapted to perform the steps of reading the handwritten samples, converting each into a type font, wherein each fonts identically resembles the corresponding handwritten sample, inputting an autograph including a message created in a font, and creating an electronic file corresponding to a photograph with an autograph, wherein the autograph appears to have been written by the person who submitted the handwritten sample. The content management system is customized by one or more coding language databases, and is adapted to read and process multiple different writing samples simultaneously, whether sent synchronously or asynchronously, to allow a user to select from a plurality of fonts to include in an autograph.

37 Claims, 3 Drawing Sheets

SYSTEM AND METHOD FOR GENERATING AUTOMATED AUTOGRAPHS

FIELD OF THE INVENTION

The present invention relates to a computer software program which allows for the combination of a pre-selected digital image and a text made up of a font created to match an individual's handwriting. The present invention allows for an unlimited number of individuals, preferably celebrities, to provide samples of their handwriting which are then inputted into a software program which converts those samples into digitized handwriting fonts. A digitized message can be created which will identically match the handwriting of the individual chosen, so as to appear that a handwritten signature was provided on the photograph.

In the preferred embodiment, the images used in the present invention are those of celebrities. This allows a user to generate a photograph of the celebrity of their choosing and write a message, either pre-recorded or personalized by the user, to replicate a signature of that celebrity.

BACKGROUND OF THE INVENTION AND DISCLOSURE

The present invention relates to a software program which enables a user to select a previously generated photograph of a celebrity and include a digitized signature and message in a font created to identically replicate that celebrity's handwriting. The present invention can be utilized for any individual and any handwriting, but the use for celebrities is disclosed as the preferred embodiment of the invention.

Fans of celebrities flock to concerts, shows, movie premieres, or any event at which celebrities will be in attendance, in the hope of securing a signature to keep in their possession. Quite often, a celebrity will merely sign their name to an article provided by the fan, whether a shirt of a piece of memorabilia (show ticket or program, for example) or any other product which can be brought by the individual. Sometimes, if the fan is "lucky" enough, the celebrity might provide a handwritten message along with the signature, or ask for that fan's name so as to write a personalized greeting. The present invention allows a means to digitally produce the end result that is desired by so many adoring fans—a personalized autograph.

The present invention utilizes a content management system, such as WordPress, which is written with a coding language database, such as PHP or MySQL. This allows the webpage to be customized with the look and feel desired by the Applicants as well as to incorporate logos, images, and text fields. A webpage is created which allows a user to browse a gallery of photos previously uploaded, and potentially continually uploaded, which the user wishes to purchase. The user can then create a message which will be displayed somewhere on the selected photograph. In one embodiment, the location of the text field and message is predetermined based on the photograph. In another embodiment, the user can select their desired placement of the text on the photo. The message which will be displayed can either be a prerecorded message, determined by the celebrity whose signature will be given, or in a potentially infinite number of messages which can be created.

The present invention software will take a handwriting sample, for example the alphabet or the copying of a book paragraph, by an individual, and create a new type font (like Times New Roman or Arial, for example) which identically replicates the handwritten version. This can be done with an infinite number of individuals. Through the submission of the handwriting sample, the software will read the shapes of the letters and the method of combination of letters in various orders so as to be able to recombine them into a different order in a personalized message.

When a user wishes to select a photograph, he may do so by looking at a gallery of all photos already uploaded, or by going to an individual celebrity's customized page. The celebrity can customize their page with photographs they have uploaded. In one embodiment of the present invention, an upload feature is disclosed which can allow the celebrity to continually submit photographs which can be used almost immediately after upload by a user of the present invention. In another embodiment of the present invention, a celebrity can upload a generic photograph which would lend itself to being combined with a photo submitted by a user. This would allow the program to combine the photographs and make it appear that the user was actually with the celebrity when the picture was taken, and thus making the signature seem all that more real.

A mechanism is disclosed which can create a font designed to replicate an individual handwriting of a celebrity. In one embodiment of the present invention, pre-recorded messages are prepared in that created font which can then be chosen by a user wishing to complete his autograph purchase. This allows each celebrity to create the messages of his or her choosing, and thus limiting what can be included on the autograph. In another embodiment of the present invention, a free-form text field salutation is presented, which allows seemingly endless possible message creations. This option would be available if a celebrity chooses to allow for any potential message to be written "from" him or her, in that signature font. Another embodiment of the present invention includes the ability to add characters prior to the autograph, wherein a user can input a salutation prior to the signature, and the celebrity's name will automatically be inputted as well. As an example, if the user were to input "love" after the message, the computer program would convert it to say "love _____," with the name of the celebrity filled in.

A profanity filter is preferably provided for both the text field where a user can input his or her name, as well as in the message box in an option that allowed for free form text. If a user attempts to include any profanity in the text field of the signature or message, it alerts the user and prevents the transaction from being completed. This prevents the situation where it appears that a celebrity, whose signature is used in the present invention, used that profane language towards a fan.

Once a user has selected an image of a given celebrity, filled in his or her name—which is then transcribed in the celebrity's handwriting font—and has either chosen a prerecorded message or created one, it is time for completion of the purchase. A low-resolution image of the finished signed picture will appear to the user on the screen so he is aware of what the final product will look like. The user is then able to finalize a purchase by "checking out," a process common in online transactions. The user will be asked to either register an account with the website, or to input his username and identification if he is already registered. Then he will be asked to input his name and address for shipping purposes, and to give an email for a confirmation receipt.

After all the information has been inputted, the user is directed to a payment page, where he can preferably pay through a PayPal account or by a credit card. An e-commerce platform is utilized to set up the online "shopping cart"— where a user collects all products for purchase—and to complete the transaction process. Preferably, Shopp is used as the e-commerce platform, but the use of others is envisioned as well. Once a user has entered his payment information, he may click to complete the purchase. Then he will receive an email—at the address previously entered upon registration or sign-in—that will include all purchase details as well as an image of the final product.

A means for printing the finished photographs, such as high-definition printer or other printer, is provided. In one embodiment of the present invention, a third party printer service is used. This third party printer receives an image of the completed photograph at or about the same time that the user receives his confirmation email verifying the purchase, and it is sent through an application programming interface which permits the autographed photograph system to communicate with the software of the publisher. This acts as a bridge to connect the two systems so that both receive confirmation of the purchase and both can see the finalized image before it is printed. As stated above, however, in an alternate embodiment, a third party is not required.

The final version of the autographed photo is completed by the system of the present invention before being sent to the printer. It is completed by a software program which automatically marries the image in the photograph with the text field of the signature. In one embodiment, each individual photograph has a predetermined position for the text field so as to maximize the visibility of the image and potentially, in one embodiment, the addition of an image of the purchaser to be inserted in the photo with the celebrity.

Also disclosed is the potential to connect the present invention to social media, such as Facebook, MySpace, LinkedIn, or Twitter. This would allow for either the upload of live photographs by celebrities wherever they may be, or for live messages pertaining to the present invention. For instance, a purchaser can write "I just bought an autographed picture of" and list a given celebrity, and post this on a message board connected to the website.

In one embodiment of the present invention, the capability is disclosed for the use of promotional codes and free giveaways. This provides incentives for those registered users to return to the site to make further purchases. Once a user has registered a username within the website, he will preferably have access to the promotional codes and giveaways. Preferably, there is an option on the e-commerce platform at the time of purchase which allows a user to enter a promotional code for some reward or discount.

In another embodiment of the present invention, the ability to hold auctions on the website is disclosed. Preferably, this would allow a limited edition photograph to be auctioned off on a one-time basis.

DESCRIPTION OF PRIOR ART

To the Applicants' and Inventors' knowledge, the only piece of prior art which allowed for the combination of a digital image and a handwriting-based printed font text was created previously by one of the present Inventors and Applicants, Seth G. Goldberg. That prior art included a system which allowed a text field to be entered based on the handwriting of a single individual (the celebrity Fifty Cent), which was then turned into a digital font for printing. It required a handwriting sample of that single individual to be sent to third party processor to create a digital font based on the handwriting sample. Once that font was created, it was turned into digital messages for placement in a text field on a photograph of that individual. The user could select from a plurality of images of that individual. This prior art system was on-line and available as part of a promotion that lasted from approximately Jan. 15, 2005 to approximately Apr. 31, 2005.

However, the present invention differs from, and improves upon, this prior art in many significant ways. The prior art was limited to the functionality that only allowed this process to be done for a single individual with a single set of handwriting. The prior art also limited the availability of alternate images to be used for the backdrop of the photograph, and was constrained to the selected images uploaded by the software programmer, as a user had an option of only three photographs on which to overlay the digitized autograph.

The present invention discloses the ability to create digitized font replicas of handwriting samples of an unlimited number of individuals, and to create a potentially unlimited number of letter combinations for message writing. This process can be performed by the program disclosed in the present invention, without requiring a third party. This allows a user to select the individual, preferably a celebrity, that they desire a picture of, and include a message which will be typed out in a font generated to identically match that individual's handwriting style. The picture possibilities are seemingly endless in the present invention, as there is disclosed a means for new photographs to be continually upload. The present invention also discloses the potential for a user to upload their own photograph which will be combined through software programming with the image of the celebrity to appear as if the two were taking a real photograph together. In an alternate embodiment, a user can upload their own photograph as well as their own handwriting sample, for creation of their own autographed pictures.

SUMMARY OF THE INVENTION

A system and method for generating automated autographs on a computer with a memory and a processor, including a scanner for inputting one or more handwritten writing samples and a content management system stored on a computer readable medium. The content management system is adapted to perform the steps of reading the handwritten writing samples input using the scanner, converting each of the writing samples into a type font associated with all letters of the alphabet, wherein each font identically resembles the corresponding handwritten sample, inputting an autograph comprising a message created in a font, and creating an electronic file corresponding to a photograph with an autograph, including overlaying the autograph on a selected photograph, and wherein the autograph appears to have been written directly by the person who submitted the handwritten writing sample. The content management system is customized by one or more coding language databases, and it is adapted to read and process multiple different writing samples simultaneously, whether the samples are sent synchronously or asynchronously, so as to allow a user to select from a plurality of fonts to include in an autograph on a selected photo. Each writing sample may correspond to one or more individuals. In the preferred embodiment of the present invention, those individuals who submit the handwritten writing samples and photographs are celebrities.

DETAILED DESCRIPTION OF THE DRAWINGS AND THE PREFERRED EMBODIMENT

Description will now be given of the invention with reference to the attached FIGS. 1-3. It should be understood that these figures are exemplary in nature and in no way serve to limit the scope of the invention as the invention will be defined by the claims, as interpreted by the Courts in an issued U.S. patent.

Figure 1:
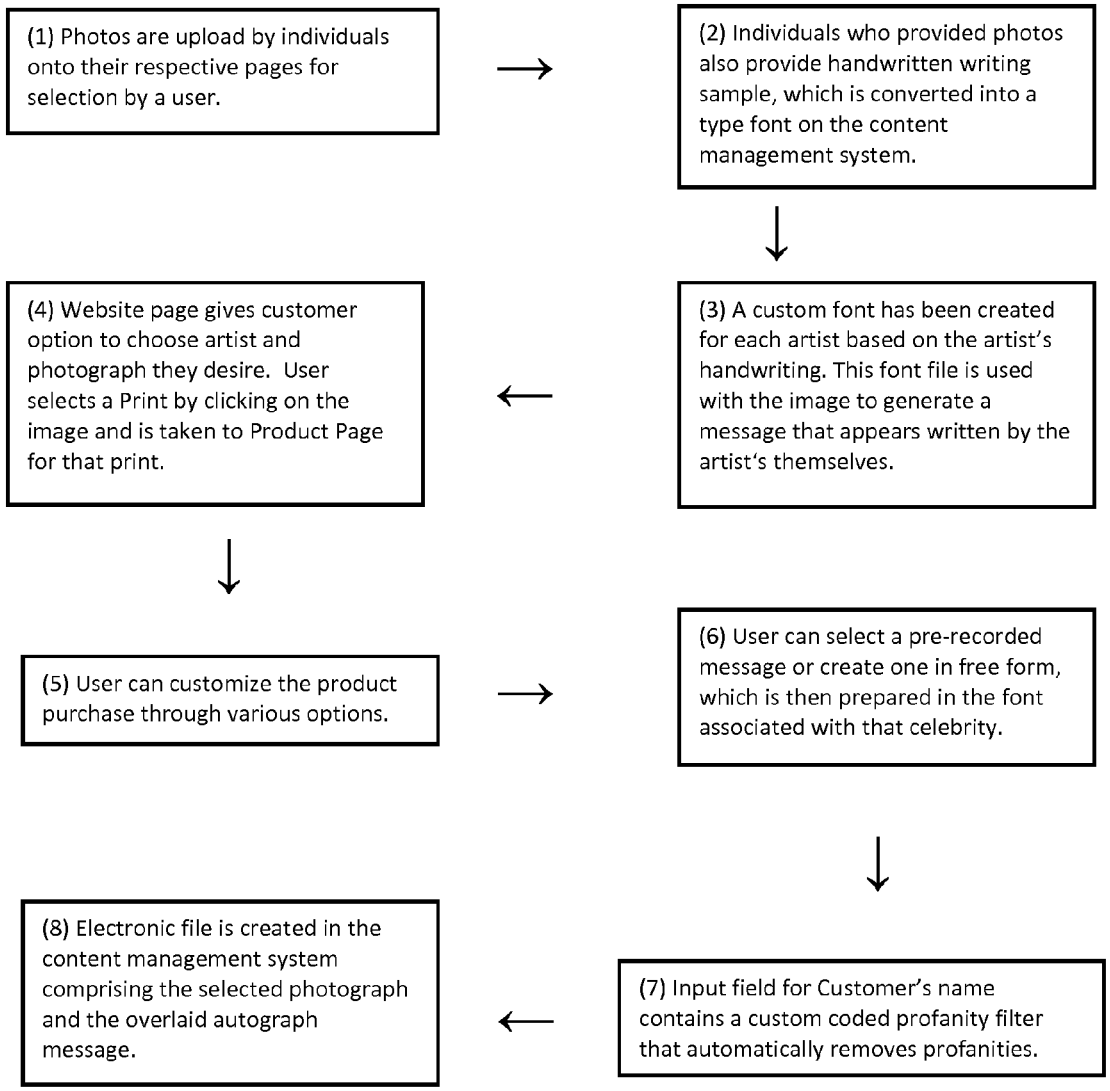
FIG. 1 shows a flowchart depicting the first half of the process performed by embodiments of the present invention, a system and method for generating automated autographs.

FIG. 1 depicts one half of the method presented by the present application. In step 1, individuals, preferably celebrities, upload photographs of themselves into the content management system to be used as the backdrops for the automated autographs created in the present invention. In the preferred embodiment, the content management system used is WordPress, but the use of alternative content management systems is disclosed as well. The content management system is customized using one or more coding language databases. Preferably, the coding language databases are one or more of PHP, MySQL, or jQuery. In step 2, those same individuals submit a handwriting sample, such as the alphabet or a copy of a book paragraph, which is then uploaded by a scanner into the content management system. The content management system, in step 3, will create a type font for printing which identically resembles the handwritten writing sample, taking into account the shape and curvature of letters as combined in various orders. The present invention discloses a content management system which can create a plurality of type fonts at once, all created from handwritten writing samples of different individuals.

In step 4, a user enters the website running the content management system of the present invention on a computer readable medium. The user will have the option to search through pre-uploaded photographs submitted by various individuals, preferably celebrities. The user can either search through a gallery of all photographs, or go to a specific page designated for one celebrity. Each celebrity has the opportunity to upload as many photographs as they would like to allow a user to choose from. In one embodiment of the present invention, a mechanism is disclosed which allows the continuous upload of photographs by a celebrity to their individual page on the content management system.

Each custom page links to that celebrity's print products available for purchase, preferably chosen by that celebrity. This page can additionally provide social media connections, such as Facebook and Twitter, as well as updates and personalized bios. Upon a request by a celebrity, each individual page is designed to reflect the look and branding of that individual. A user can select at least one photograph which they wish to use for an autograph. In step 5, a user can customize their photograph by selecting the dimensions of the picture and whether they would like metallic or glossy paper. In an alternate embodiment, the autographed photograph is preferably printed on a sheet of aluminum. The use of alternate paper styles or materials for the surface of the autographed photo is disclosed as well. In one embodiment of the invention, a user then has the option to frame a selected image.

Then in step 6, a user can select the message which will appear in the autograph. In one embodiment of the present invention, pre-recorded messages, created by each individual celebrity, can then be selected by a user. This limits the choice of message as well as allows the celebrity to control the content displayed.

In an alternate embodiment of the present invention, a free form text field enables a user to create any message of his or her choosing to be displayed in the autograph. Where the user may enter a message in the free form text field, he may also select a sign-off from the signer of the autograph. As an example, if the user were to input "love" after the message, it the computer program would convert it to say "love _____," with the name of the celebrity filled in. In the latter embodiment, a profanity filter is included in the content management system, which will detect the use of profanity in a message, alert the user, and prevent completion of the purchase.

In either embodiment, this profanity filter exists for the text field where a user can input his or her name, and the celebrity sign-off, as done in step 7. The user can select a message which can be displayed in a plurality of fonts corresponding to a plurality of individuals who submitted photographs.

Finally in step 8, the content management system creates an electronic file which will correspond to a given selected photograph. This file will include an autograph, whether chosen from a pre-recorded list or newly created, in the font that resembles the handwriting of the celebrity whose picture is shown. This file will display the complete and finalized image to eventually be purchased by the user, and it is what will eventually be sent to the printer.

Figure 2:
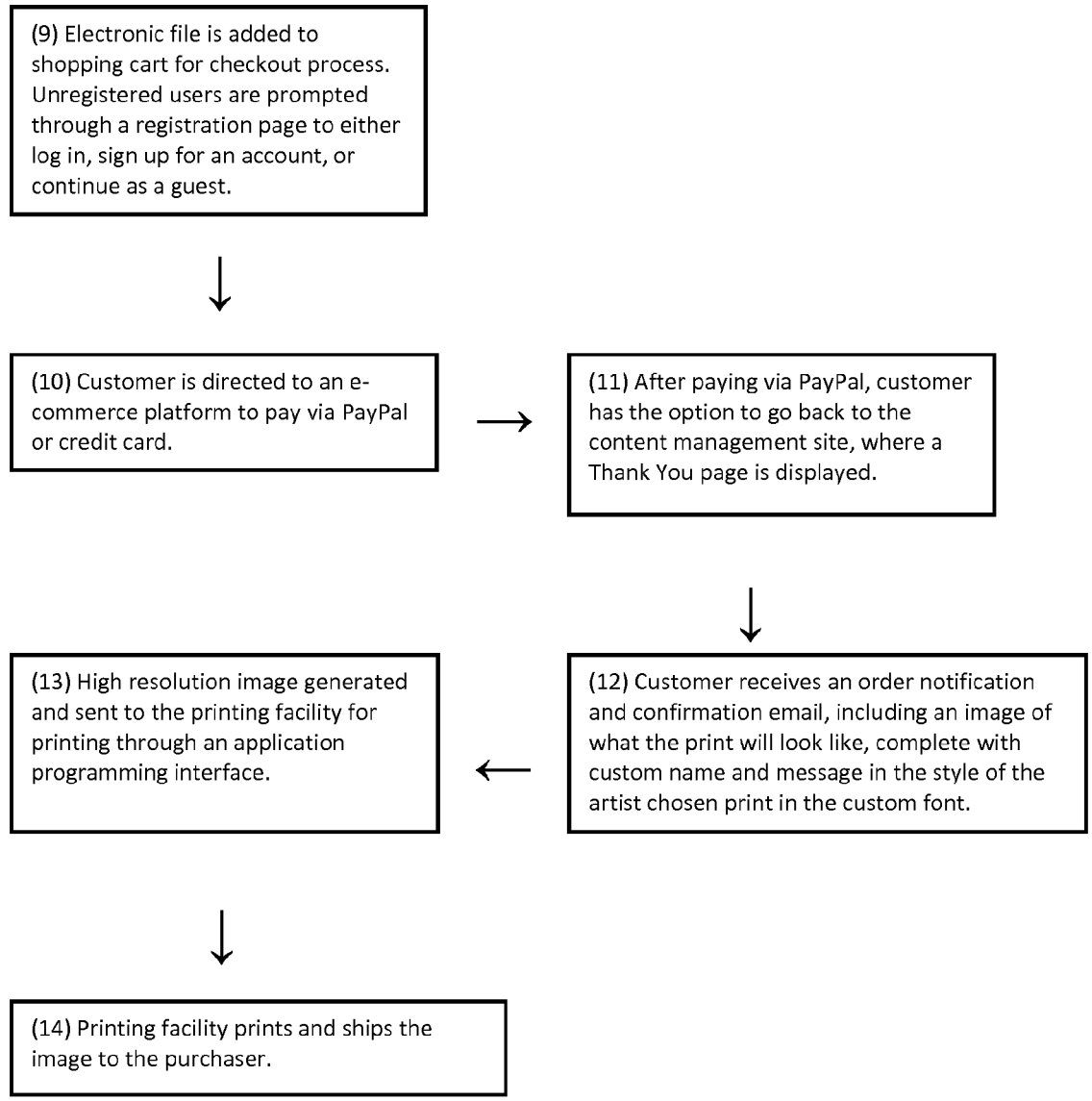
FIG. 2 shows a flowchart depicting the second half of the process performed by embodiments of the present invention.

FIG. 2 depicts the second half of the automated autograph process. Once a user has selected a photograph and autograph message, he can add the electronic file to his "shopping cart" for purchase. This is seen in step 9. A user will be asked to either log-in using his registered username and password (if he is a repeat customer), or to register a new username for the system. In step 10, the user is prompted to an e-commerce platform for purposes of payment. In the preferred embodiment, Shopp is used as the e-commerce platform, but the use of other alternatives is envisioned as well. In one embodiment of the present invention, the capability is disclosed for the use of promotional codes and free giveaways. This provides incentives for those registered users to return to site to make further purchases. Once a user has registered a username within the content management system 330, he will preferably have access to the promotional codes and giveaways. Preferably, there is an option on the e-commerce platform at the time of purchase which allows a user to enter a promotional code for some reward or discount.

After completion of the purchase, the user can return to the content management page, so they can see a Thank You page and a summary of their purchase. This is shown in step 11. In step 12, the content management system will send an order notification and confirmation email to the user, which will include an image of what the print will look like, complete with custom name and message in the style of the artist chosen print in the custom font. In a preferred embodiment, the administrator of the content management system will receive the same email confirmation.

In one embodiment of the present invention, a printing facility is used to print the completed electronic files. In this embodiment, step 13 shows a high resolution image being generated and sent to the printing facility. The content management system's e-commerce site and the printing facility systems are connected through an application programming interface. This collects the selected image from a folder on the content management system, combines it with the message specified in the particular font desired, and delivers them to the printing facility. In this embodiment, where a printing facility is used, step 14 discloses the printing facility printing and sending a finalized version of the autographed image to the purchaser. As explained above, the use of a printing facility, nor a means for printing, is not a required component of the present invention, as an alternate embodiment of the present invention would allow for email transfer of the finalized images to a purchaser.

Figure 3:
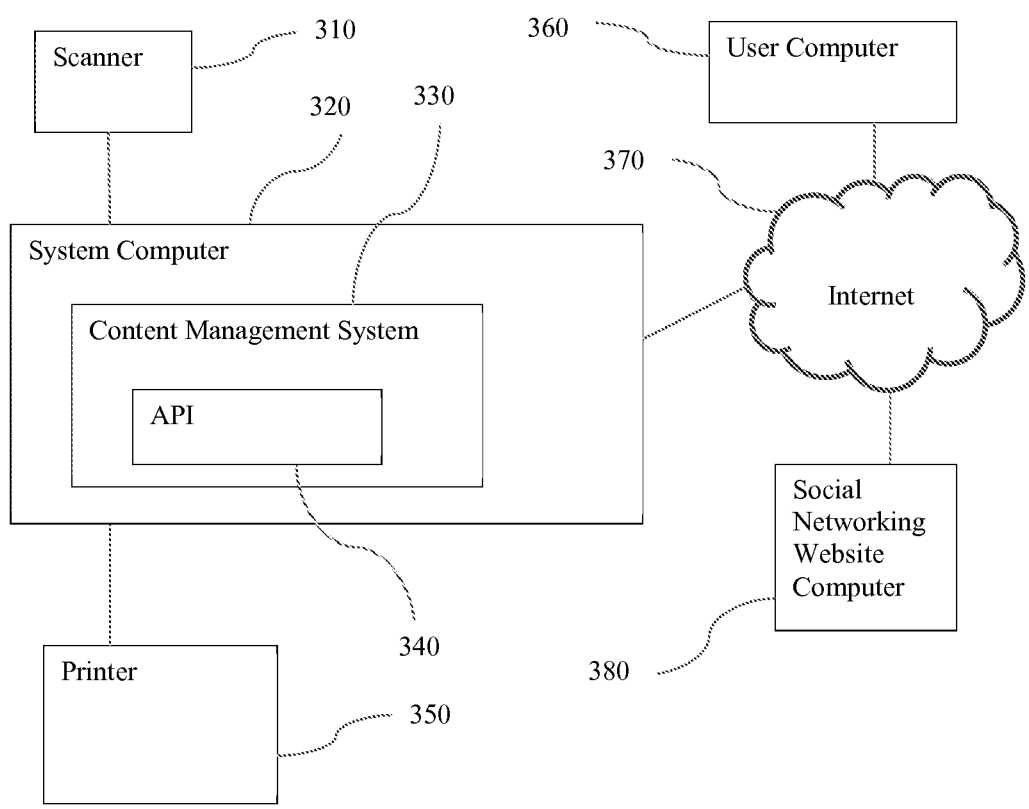
FIG. 3 shows the system used to support the process of embodiments of the present invention.

FIG. 3 depicts a schematic of the system used to support the process of embodiments of the present invention. As was depicted in FIGS. 1 and 2, a handwriting sample and photographs of an individual, preferably a celebrity, will be entered into the system of the present invention, preferably using scanner 310. That handwriting sample will be entered into the content management system 330 of a system computer 320, which will then read the sample and convert it into a digitized font.

A user will enter his computer 360 and use the internet 370 to connect to the content management system 330 of the present invention. In one embodiment of the present invention, the computer 360 can be a smartphone or tablet, wherein the user accesses the content management system 330 by means of a mobile app. This embodiment allows a user to get notifications of newly uploaded prints while on the go. The user will then engage in the process as described above, selecting a photograph and a digitized handwriting font for creation of an automated autograph. Upon completion of the selection, and payment for the purchase, the content management system 330 will preferably connect to a printer 350 by use of an application programming interface 340. This allows a final copy of the created and purchased autograph to be printed for the user.

In an embodiment of the present invention, the use of social media to connect to the content management system is envisioned. This would allow continuous uploading of photographs by the individuals, preferably celebrities, who would connect their webpage to social media accounts such as Facebook, MySpace, Twitter, or LinkedIn. Additionally, the connection to social media would allow the content management system 330 to automatically send updates to the social media account, such as Twitter or Facebook, where a message could be sent regarding up-to-the-minute purchases.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed:

1. A system for generating automated autographs on a computer with a memory and a processor, the system including:
   a scanner for inputting one or more handwritten writing samples;
   a content management system stored on a computer readable medium, said computer readable medium containing instructions which, when executed by the computer, cause the computer to perform the steps of:
      reading said handwritten writing samples input using said scanner;
      converting each of said writing samples into a type font associated with all letters of the alphabet, wherein each of a plurality of fonts identically resembles a corresponding handwritten sample;
      selecting at least one photograph from a predetermined group of photographs;
      inputting an autograph comprising a message created in said font; and
      creating an electronic file corresponding to said photograph with said autograph, including overlaying said autograph on said selected photograph, wherein said autograph appears to have been written directly by a person who submitted said handwritten writing samples;
   wherein said content management system is customized by one or more coding language databases;
   wherein said content management system is adapted to read and process multiple different writing samples simultaneously, whether said writing samples are sent synchronously or asynchronously, so as to allow a user to select from the plurality of said fonts to include in said autograph on said selected photograph; and
   wherein said writing samples correspond to one or more individuals.

2. A system for generating automated autographs as stated in claim 1, wherein said photographs are selected from a group submitted by individuals who submit said handwritten writing samples, and wherein said photographs can be continually uploaded.

3. A system for generating automated autographs as stated in claim 2, wherein said photographs can depict a plurality of different said individuals.

4. A system for generating automated autographs as stated in claim 2, wherein said individuals who submit said photographs and said handwritten writing samples are celebrities.

5. A system for generating automated autographs as stated in claim 2, wherein the user can select any of said photographs depicting any of said individuals.

6. A system for generating automated autographs as stated in claim 1, wherein said content management system is adapted to associate said photograph selected with a corresponding font.

7. A system for generating automated autographs as stated in claim 1, wherein said message can be selected from a pre-recorded list of messages.

8. A system for generating automated autographs as stated in claim 1, wherein said message can be created in a free-form text field.

9. A system for generating automated autographs as stated in claim 1, wherein the user can input his or her own name for inclusion in said autograph.

10. A system for generating automated autographs as stated in claim 1, wherein said content management system includes a profanity filter for processing text field of said message to identify a use of profanity.

11. A system for generating automated autographs as stated in claim 1, wherein the user can upload their own photograph.

12. A system for generating automated autographs as stated in claim 11, wherein said computer will combine said uploaded photograph of the user with said selected photograph.

13. A system for generating automated autographs as stated in claim 11, wherein the user can submit their own handwriting sample for selection with their own said photograph.

14. A system for generating automated autographs as stated in claim 1, wherein the user can pay for said autograph through an e-commerce platform.

15. A system for generating automated autographs as stated in claim 1, wherein said content management system is adapted to transmit said electronic file to a printer.

16. A system for generating automated autographs as stated in claim 15, wherein said printer is a printing facility.

17. A system for generating automated autographs as stated in claim 16, wherein said content management system is adapted to transmit said electronic file to said printing facility through a use of an application programming interface.

18. A system for generating automated autographs as stated in claim 1, wherein said content management system is adapted to transmit a confirmation email of purchase of said autograph to a purchaser.

19. A system for generating automated autographs as stated in claim 1, wherein said computer is a mobile device.

20. A method for generating automated autographs on a computer with a memory and a processor, comprising:
scanning, by a scanner, one or more handwritten writing samples into a content management system stored on a computer readable medium, said computer readable medium containing instructions which, when executed by the computer, cause the computer to perform the steps of:
reading said writing sample input using said scanner on said content management system, said content management system capable of reading and processing multiple different writing samples simultaneously, whether said samples are sent synchronously or asynchronously, and whether said samples are sent by the same or different individuals;
converting each of said writing samples into a type font associated with all letters of the alphabet, wherein each of a plurality of fonts identically resembles a corresponding handwritten sample, so as to allow a user to select from the plurality of said fonts to include in an autograph on a selected photo;
selecting at least one photograph from a predetermined group of photographs;
inputting said autograph comprising a message created in said font; and
creating an electronic file corresponding to a selected photograph with said autograph, including overlaying said autograph on said selected photograph, wherein said autograph appears to have been written directly by a person who submitted said handwritten writing sample;
wherein said content management system is customized by one or more coding language databases.

21. A method for generating automated autographs as stated in claim 20, wherein said photographs are selected from a group submitted by individuals who submit said handwriting samples, and wherein said photographs can be continuously uploaded.

22. A method for generating automated autographs as stated in claim 21, wherein said photographs can depict a plurality of different said individuals.

23. A method for generating automated autographs as stated in claim 21, wherein said individuals who submit said photographs and said handwriting samples are celebrities.

24. A method for generating automated autographs as stated in claim 21, wherein the user can select any of said photographs depicting any of said individuals.

25. A method for generating automated autographs as stated in claim 20, wherein said content management system is adapted to associate said photograph selected with a corresponding font.

26. A method for generating automated autographs as stated in claim 20, wherein said message can be selected from a pre-recorded list of messages.

27. A method for generating automated autographs as stated in claim 20, wherein said message can be created in a free-form text field.

28. A method for generating automated autographs as stated in claim 20, further comprising the step of the user inputting his or her own name for inclusion in said autograph.

29. A method for generating automated autographs as stated in claim 20, wherein said content management system includes a profanity filter for processing text field of said message to identify use of profanity.

30. A method for generating automated autographs as stated in claim 20, further comprising the step of the user uploading his or her own photograph for combination with said selected photograph.

31. A method for generating automated autographs as stated in claim 20, wherein the user can pay for said autograph through an e-commerce platform.

32. A method for generating automated autographs as stated in claim 20, wherein said content management system is adapted to transmit said electronic file to a printer.

33. A method for generating automated autographs as stated in claim 32, wherein said printer is a printing facility.

34. A method for generating automated autographs as stated in claim 33, wherein said content management system is adapted to transmit said electronic file to said printing facility through use of an application programming interface.

35. A method for generating automated autographs as stated in claim 32, wherein said electronic file is transmitted to a customer for printing.

36. A method for generating automated autographs as stated in claim 20, further comprising the step of said content management system transmitting a confirmation email of a purchase to a purchaser.

37. A method for generating automated autographs as stated in claim 20, wherein said computer is a mobile device.

* * * * *